(12) United States Patent
Gunuganti et al.

(10) Patent No.: US 12,316,505 B2
(45) Date of Patent: May 27, 2025

(54) APPLICATION-AGNOSTIC TENANT ONBOARDING ONTO A MULTI-TENANT SYSTEM

(71) Applicant: Alkira, Inc., San Jose, CA (US)

(72) Inventors: Ramakanth Gunuganti, San Jose, CA (US); Yogendra Singh, San Jose, CA (US)

(73) Assignee: ALKIRA, INC., San Jose, CA (US)

( * ) Notice: Subject to any disclaimer, the term of this patent is extended or adjusted under 35 U.S.C. 154(b) by 0 days.

(21) Appl. No.: 17/998,730

(22) PCT Filed: Apr. 15, 2021

(86) PCT No.: PCT/US2021/027568
§ 371 (c)(1),
(2) Date: Nov. 14, 2022

(87) PCT Pub. No.: WO2021/211906
PCT Pub. Date: Oct. 21, 2021

(65) Prior Publication Data
US 2023/0336428 A1    Oct. 19, 2023

Related U.S. Application Data

(60) Provisional application No. 63/010,599, filed on Apr. 15, 2020.

(51) Int. Cl.
*G06F 9/50* (2006.01)
*H04L 41/0894* (2022.01)
*H04L 41/12* (2022.01)

(52) U.S. Cl.
CPC .......... *H04L 41/12* (2013.01); *H04L 41/0894* (2022.05)

(58) Field of Classification Search
CPC ...... H04L 41/12; H04L 41/0894; H04L 67/10
See application file for complete search history.

(56) References Cited

U.S. PATENT DOCUMENTS 9,734,349 B1 * 8/2017 Prafullchandra ... G06F 21/6218
10,558,542 B1 * 2/2020 A ........................... H04L 41/12
(Continued)

OTHER PUBLICATIONS

International Search Report and Written Opinion for related International Application No. PCT/US2021/027568, mailed Jul. 7, 2021 (6 Pages).

*Primary Examiner* — Schquita D Goodwin
(74) *Attorney, Agent, or Firm* — Vani Moodley, Esq.

(57) ABSTRACT

Disclosed is a controller with an application-agnostic customer gateway comprising a dataplane management gateway, a dataplane management engine configured to take care of intent of platform-agnostic customer requests by onboarding on a nearest-to-customer platform and splitting requests into granular tasks to be carried out in a given region, a customer gateway for providing customer access to a customer network, a tenant management engine, a tenant provisioning engine, and a resource management engine. The dataplane management engine facilitates communication between a first admin agent and a dataplane provisioning and orchestration system, the tenant management engine facilitates communication between a second admin agent and the dataplane provisioning and orchestration system, the tenant provisioning engine facilitates communication between a third admin agent and the dataplane provisioning and orchestration system, and the resource management engine enables a customer agent to express intent regarding resource management.

10 Claims, 5 Drawing Sheets

(56) References Cited

U.S. PATENT DOCUMENTS

| | | | |
|---|---|---|---|
| 10,833,940 B2* | 11/2020 | Cencini | G06F 1/189 |
| 11,470,161 B2* | 10/2022 | Senftleber | H04L 67/535 |
| 2014/0365555 A1* | 12/2014 | Jwalanna | G06F 16/176 |
| | | | 709/203 |
| 2017/0034076 A1* | 2/2017 | Wang | H04L 45/745 |
| 2017/0078410 A1* | 3/2017 | Rao | H04L 41/5025 |
| 2017/0331859 A1 | 11/2017 | Bansal et al. | |
| 2018/0075009 A1* | 3/2018 | Baryshnikov | G06F 40/186 |
| 2019/0042378 A1* | 2/2019 | Wouhaybi | H04L 67/125 |
| 2019/0207812 A1* | 7/2019 | Li | H04L 63/0807 |
| 2020/0120182 A1* | 4/2020 | Kotecha | H04L 47/70 |
| 2020/0358876 A1* | 11/2020 | Kulkarni | G06F 9/5072 |
| 2021/0092021 A1* | 3/2021 | Choukir | H04L 41/12 |
| 2025/0023784 A1* | 1/2025 | Jost | H04L 41/0894 |

\* cited by examiner

APPLICATION-AGNOSTIC TENANT ONBOARDING ONTO A MULTI-TENANT SYSTEM

CROSS-REFERENCE TO RELATED APPLICATIONS

This application is a national phase application pursuant to 35 U.S.C. § 371 of International Application No. PCT/US2021/027568, entitled "APPLICATION-AGNOSTIC TENANT ONBOARDING ONTO A MULTI-TENANT SYSTEM", and filed on Apr. 15, 2021, which claims benefit of U.S. Provisional Application No. 63/010,599, entitled "APPLICATION-AGNOSTIC TENANT ONBOARDING ONTO A MULTI-TENANT SYSTEM", and filed on Apr. 15, 2020, which is incorporated herein by reference in its entirety.

DETAILED DESCRIPTION

Figure 1:
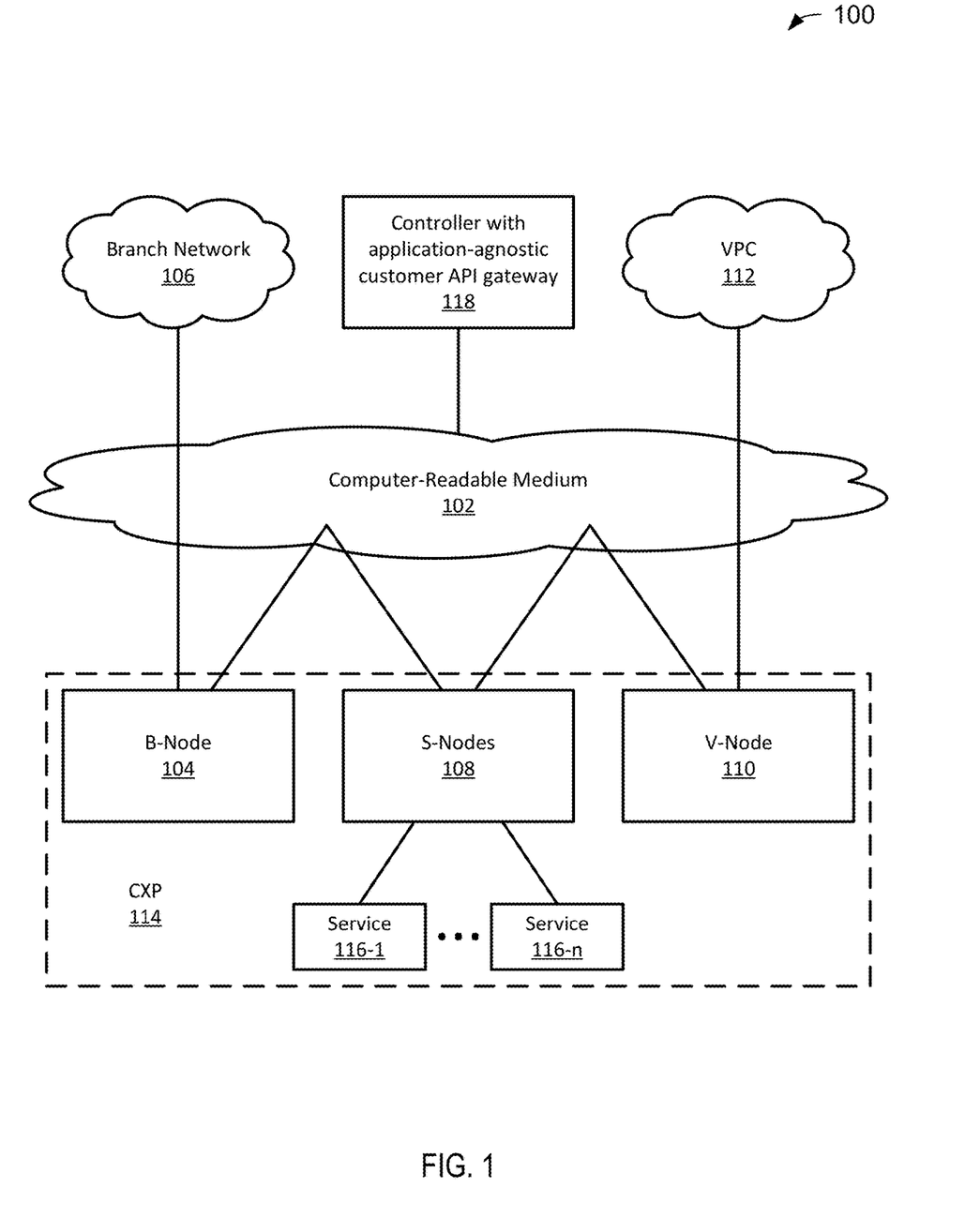
FIG. 1 is a diagram of an example of a system for application-agnostic tenant onboarding onto a multi-tenant system.

FIG. 1 is a diagram 100 of an example of a system for application-agnostic tenant onboarding onto a multi-tenant system. The diagram 100 includes a computer-readable medium (CRM) 102, a branch-facing node (B-node) 104 coupled to the CRM 102, a branch network 106 coupled to the B-node 104 through the CRM 102, service point attachment nodes (S-nodes) 108 coupled to the CRM 102, a virtual network facing node (V-Node) 110 coupled to the CRM 102, a virtual private cloud (VPC) 112 coupled to the V-Node 110 through the CRM 102, and a controller with application-agnostic customer API gateway 118. In the diagram 100, a cloud services exchange platform (CXP) 114 includes the B-node 104, the S-nodes 108, the V-node 110, and a service engine 116-1 to a service engine 116-n (collectively, the services 116) coupled to the S-nodes 108.

The CRM 102 in intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The B-Node 104 is intended to represent an engine that couples the branch network 106 to the CXP 114. In a specific implementation, the B-node is responsible for branch-to-cloud traffic. For example, the branch network 106 is intended to represent a campus, site, data center, or other branch network under the control of a customer. In a specific implementation, the B-node 104 creates an overlay to connect a network branch to the cloud. Data traffic originating from the branch network 106 within a given region may be controlled, managed, observed, and evaluated by the CXP 114. In a specific implementation, the customer, or a human or artificial agent thereof, managing the branch network 106, or a portion thereof, can access a single portal to select one or more of the services 116 in connection with a software as a service (SaaS), IaaS, or PaaS offering. In a specific implementation, the B-node 104 (potentially including other B-nodes, not shown) connects the CXP 114 to multiple different branch networks.

The S-nodes 108 are intended to represent multi-tenant node engines adapted to orchestrate the instantiation, hosting, and/or provisioning of the services 116 (selected via a portal accessible in association with the CXP 114) to one or more endpoints on behalf of a customer. S-nodes 108 may host services and apply policies that might otherwise only be available through other cloud platforms, in other regions or otherwise only available with certain connectivity. For instance, if a customer using Cloud Platform A desired certain security features provided by Firewall X service that was only available through Cloud Platform B, the S-nodes 108 may, via an orchestration component, host the Firewall X service for the customer so that the customer may obtain the service as though they were using Cloud Platform B. Even if a customer uses different cloud platforms or has different connectivity throughout different segments of its network, the dashboard of the CXP 114's portal may provide the foregoing features (e.g., monitoring traffic, managing connectivity, etc.) within the same dashboard interface. In a specific implementation, to effectuate these features, all data traffic is routed through the S-nodes 108.

The S-nodes 108 may send/receive traffic to and from networks implementing any type of connectivity (e.g., MPLS, SD-WAN, $IP_{SEC}$, etc.) and host services from any one or more providers so that the connecting networks may receive the benefit of those services without the hassle of reconfiguring their network to adapt to the service provider's requirements. The S-nodes 108 can instantiate such services automatically upon request, so that an individual user associated with or connected through the branch network 106 does not have to instantiate the services themselves. The S-nodes 108 may collect telemetry data (e.g., to share with a multi-tenant orchestrator component), may tie the data flow to an application once packet details have been determined, may conduct analytics (e.g., statistical analysis) on data flow on a tailored basis (e.g., one in every ten packets received may be subjected to a deep packet inspection routine), and may tag or add instructions to packets for execution at a workload.

The V-Node 110 is intended to represent an engine that couples the CXP 114 to the VPC 112. The VPC 112 is intended to represent a SaaS, IaaS, PaaS, or V-net. In a specific implementation, the V-node is responsible for cloud-to-cloud traffic. For example, the V-node 110 (potentially including other V-nodes, not shown) connects the CXP 114 to different clouds.

The CXP 114 is intended to represent a system that establishes connectivity, instantiates services for corresponding geolocations, aggregates data, implements policies, monitors traffic, and/or provide analytics across disparate cloud service providers and different connectivity architectures. In a specific implementation, CXP 114 operates in a manner that—to the customer—is connectivity agnostic and cloud provider agnostic. The CXP 114 may correspond to aggregated services offered for a given region or set of regions, where the regions may comprise one or more zones corresponding to subsections of such regions. The CXP 114 may service the branch network 106 within a particular region, and multiple CXPs may be stitched together as part of a larger cloud servicing network (e.g., mesh network, hub-and-spoke network, or a network having some other topology) to span multiple regions. In a specific implementation, the CXP 114 provides a portal through which a network administrator or other user associated with a customer may (i) view and select SaaS/IaaS/other services from a range of providers (or provided by the customer itself) within a common dashboard, (ii) manage connectivity (e.g., MLPS, SD-WAN, $IP_{SEC}$, etc.), (iii) monitor traffic, (iv) control traffic in accordance with one or more policies (e.g., security policies), etc.

The controller with application-agnostic customer API gateway 118 is intended to represent a controller that facilitates intent-based orchestration building. That is, it enables customers (multi-tenant) to express intent regarding how to use the entities so as to define their networks. Advantageously, from a single portal, orchestration framework builds a network with scalable bandwidth capacity across regions and across multi-cloud vendors like AWS, Azure, and GCP without any requirement the customers learn about the multiple cloud vendors or cross-vendor connectivity. It provides customers granularity of building micro segments within their networks with isolation, security, manageability and visibility.

Figure 2:
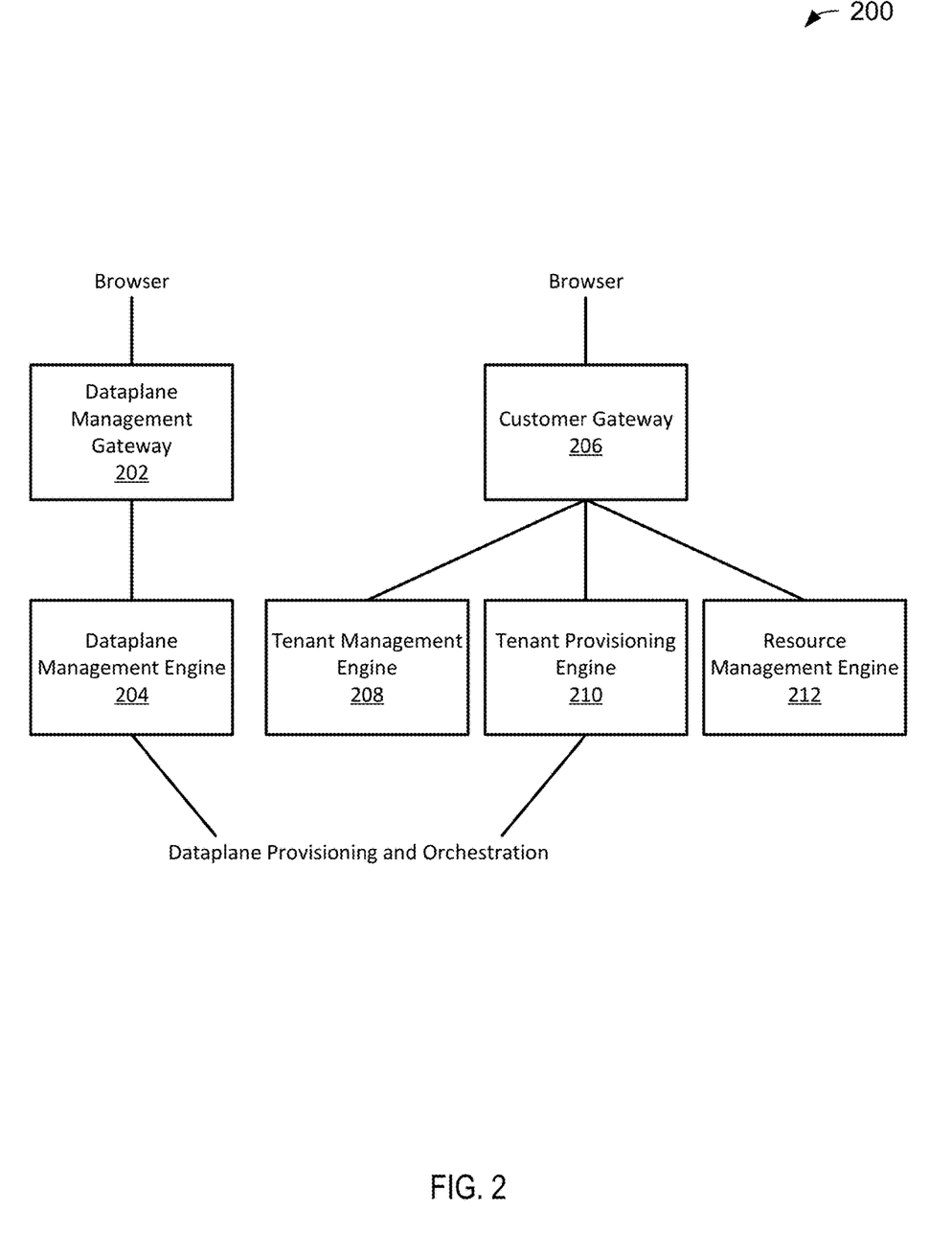
FIG. 2 is a diagram of an example of a controller with application-agnostic customer API gateway.

FIG. 2 is a diagram 200 of an example of a controller with application-agnostic customer API gateway, such as the controller with application-agnostic customer API gateway 118 of FIG. 1. The diagram 200 includes a dataplane management gateway 202, a dataplane management engine 204 coupled to the dataplane management gateway 202, a customer gateway 206, a tenant management engine 208 coupled to the customer gateway 206, a tenant provisioning engine 210 coupled to the customer gateway 206, and a resource management engine 212 coupled to the customer gateway 206.

The dataplane management gateway 202 is intended to provide an admin, such as a dataplane administrator, access to underlying infrastructure onto which tenants are onboarded. In a specific implementation, connectivity to the dataplane management gateway 202 is via a browser. The dataplane management engine 204 is intended to represent an engine that facilitates communication between an admin, or a human or artificial agent thereof, and a dataplane provisioning and orchestration system. In this way, the dataplane management engine 204 can stitch tunnels into a dataplane and enable a customer to control flows using policy (e.g., via an "actions" tab). In an alternative, the dataplane management gateway 202 is a devops gateway and dataplane management is handled by a separate entity; in this alternative, there would be a distinct devops admin and a distinct dataplane admin.

The customer gateway 206 is intended to provide a customer access to a customer network without exposing underlying infrastructure onto which tenants are onboarded. In a specific implementation, connectivity to the customer gateway 206 is via a browser. The tenant management engine 208 is intended to represent an engine that enables a customer, or human or artificial agent thereof, to express intentions regarding tenant management. The tenant provisioning engine 210 is intended to represent an engine that facilitates communication between an admin, or a human or artificial agent thereof, and a dataplane provisioning and orchestration system. In this way, the tenant provisioning engine 210 can spin up nodes and build a mesh. The resource management engine 212 is intended to represent an engine that enables a customer, or human or artificial agent thereof, to express intentions regarding resource management. In a specific implementation, the tenant provisioning engine 210 talks to resource management engine 212, which has full view (e.g., how many dataplanes, how many tenants, how many CXPs, a mapping of all of these, and the like).

Additional components (not shown in FIG. 2) include a logging engine, licensing engine, monitoring engine, notification engine, access management engine, policy management engine, user management engine, credential service, and others.

In a specific implementation, the customer need only know about components of the customer network, not underlying infrastructure. For example a customer at a data center can request firewall, security, or other services in a platform-agnostic manner (e.g., "I need 1 gig capacity") and a dataplane manager will take care of the intent regardless of the underlying infrastructure (e.g., AWS, Azure, or the like, all of which are different) by fulfilling requests, onboarding (creating accounts) on a nearest-to-customer platform, splitting requests into granular tasks to be carried out in a given region (including cross-cloud, in parallel/serial, avoiding regions with undesirable rules (e.g., patent infringement), do tasks based on available resources using health metrics, or the like). Intentions can be expressed in terms of connectors (e.g., how to get data from branch networks into a cloud), services (e.g., firewall, load balancer, etc.), and applications (the details of which need not be known). Tasks can fail, which may prompt a dataplane manager to fix out-of-band and retry, retry orchestration from a point of failure, or take other action. Generally, it may be desirable to leave control in a customer's hands but give access to devops specialists to assist. Alerts can be generated for devop or customer, depending upon circumstances. For example, establishing an IPSEC tunnel requires agreement on both sides, so even if a dataplane manager does everything right, a customer must still be prompted to do it right on the customer side.

Figure 3:
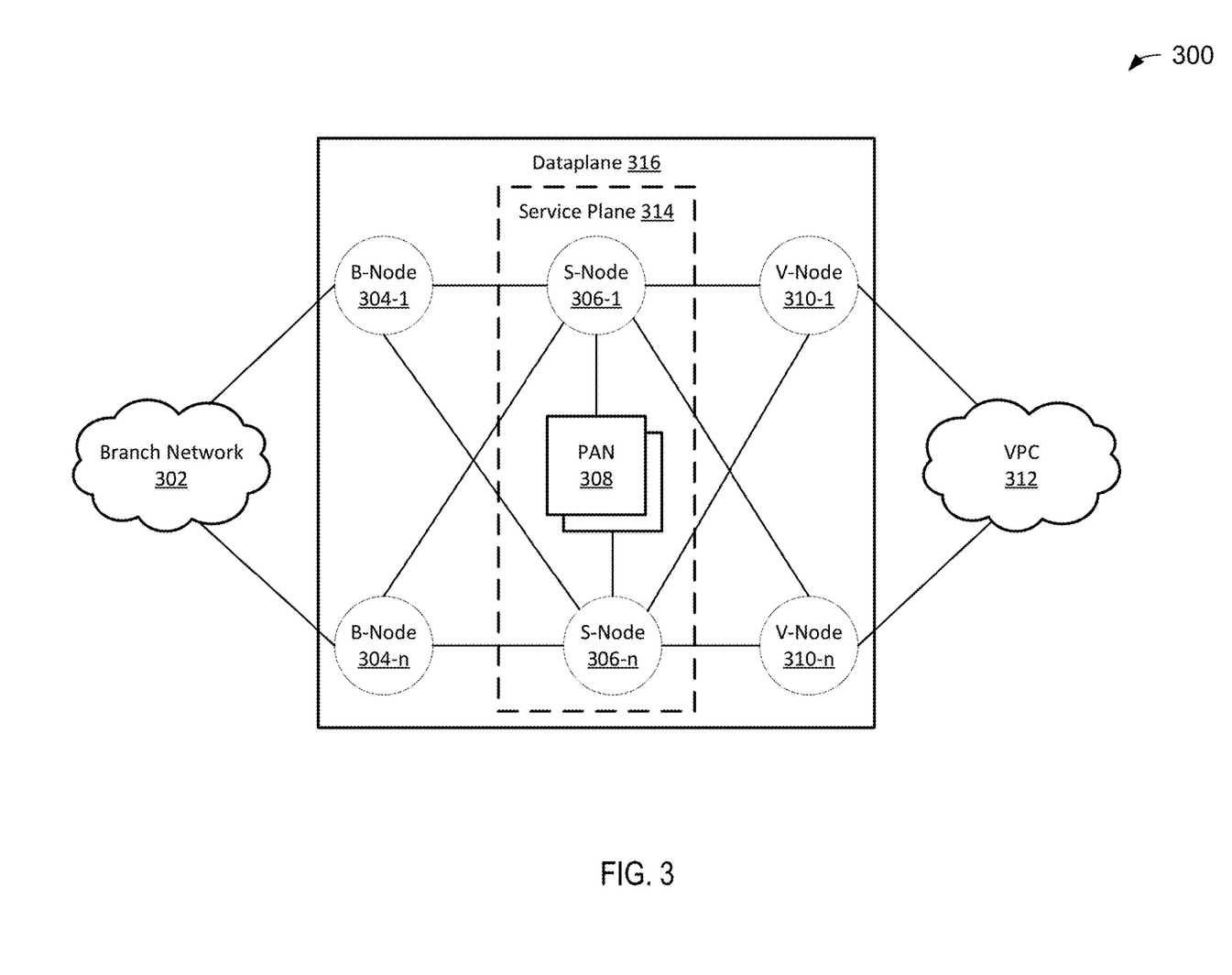
FIG. 3 is a diagram illustrating a dataplane.

FIG. 3 is a diagram 300 illustrating a dataplane. The diagram 300 includes a branch network 302, a B-node 304-1 to a B-node 304-n (collectively, the B-nodes 304) coupled to the branch network 302, an S-node 306-1 to an S-node 306-n (collectively, the S-nodes 306) coupled to the B-nodes 304, processing area networks (PANs) 308 coupled to the S-nodes 306, a V-node 310-1 to a V-node 310-n (collectively, the V-nodes 310) coupled to the S-nodes 306, and a VPC 312 coupled to the V-nodes 310. It may be noted that 'n' may or may not be indicative of the same number of each type of illustrated node.

Some elements omitted from the diagram 300 includes branch tunnels, gateway nodes (G-nodes), router filters, SaaS channels to the Internet, and cloud tunnels to the cloud. Branch tunnels can be implemented as, e.g., IPSEC tunnels into a regional dataplane. Each B-node can have a corresponding G-node or a group of B-nodes can have a corresponding G-node; G-nodes couple an orchestration service to a B-node. Router filters are coupled to B-nodes, S-nodes, and V-nodes on the control channel. Cloud tunnels couple the dataplane to one or more cloud platforms, such as AWS, GCP, and Azure.

The branch network 302 is similar to the branch network 104 of FIG. 1 and the VPC 312 is similar to the VPC 112 of FIG. 1. The S-nodes 306 and the PANs 308 can be referred to as a service plane 314. The B-nodes 304, service plane 314, and V-nodes 310 can be referred to as a dataplane 316. As illustrated in the diagram 300, the dataplane 316 operationally connects the branch network 302 to the VPC 312 with multiple sets of nodes. An example of a data plane 316 is an ALKIRA CLOUD SERVICE NODE (CSN)™ dataplane, which is a collection of nodes that moves customer traffic between connectors and through various service functions using a series of overlay tunnels.

The B-nodes 304 are intended to represent a collection of engines, including traffic handling engines from connectors to and from the branch network 302. The S-nodes 306 are intended to represent a collection of engines, including engines for executing stateful functions and service steering. The V-nodes 310 are intended to represent a collection of engines, including traffic handling engines from connectors to and from the VPC 312. Each type of node can be independently scaled for resiliency reasons and/or to achieve higher scale.

In an example of operation, a forward flow from a source in the branch network 302 (e.g., originating at a client behind an SDWAN) to a destination (e.g., a server) in the VPC 312, for illustrative purposes, traverses the B-node 304-1, the S-node 306-1, and the V-node 310-1. In addition, the forward flow can be characterized as passing from the S-node 306-1 to the PANs 308 and back to the S-node 306-1 before passing to the V-node 310-1.

In this example of operation, a stateful processing reverse flow traverses the V-node 310-1, the S-node 306-1, and the B-node 304-1 when passing from what was the destination (e.g., the server) to what was the source (e.g., the client). In addition, the stateful reverse flow can be characterized as passing from the S-node 306-1 to the PANs 308 and back to the S-node 306-1 before passing to the B-node 304-1. In a specific implementation, stateful reverse flow is achieved by configuring a VB node (e.g., the B-node 304-1 and the V-node 310-1) with an identical set of S-nodes (e.g., the S-nodes 306). Advantageously, if B-node 304-1 goes down, another of the B-nodes 304 can use the hash to maintain flow identity in a stateless way, though flow identity (state) is still maintained on the service plane 314. It may be desirable for the B-nodes 304 to maintain state for efficiency, but there are multiple ingress nodes and a hit node can compute the hash in exactly the same way, making the maintenance of state at the B-nodes 304 optional, assuming an implementation in which the B-nodes 304 are just used for steering traffic.

Figure 4:
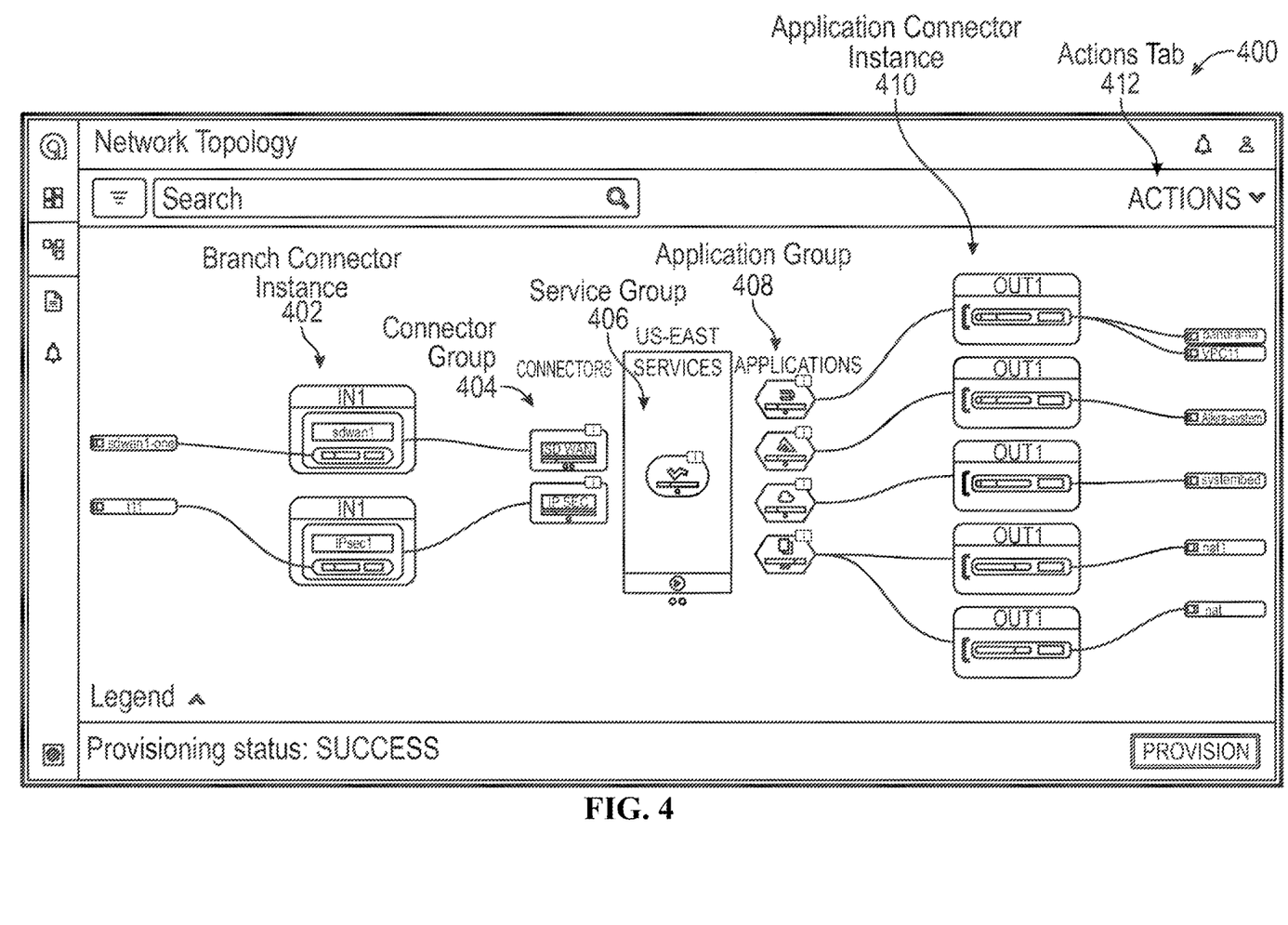
FIG. 4 is a screen shot of an example of a browser interface for a customer.

A customer would not need to have a robust understanding of the dataplane to provide intent through a customer interface, an example of which is illustrated in FIG. 4. FIG. 4 is a screen shot 400 of an example of a browser interface for a customer. The screen shot 400 includes a branch connector instance 402, a connector group 404, a service group 406, an application group 408, an application connector instance 410, and an actions tab 412. In a specific implementation, the edges between the components can be color coded to designate segments. Using these tools, a customer can define network micro-segments and place connectors, services, groups, and policies (which can be selected from the actions tab) into segments. Once the tenant network is fully defined, customers can trigger provisioning of the network without any idea how it will need to be done.

In a specific implementation, the customer portal takes the intent split micro segment provisioning into granular tasks that span across regions and cloud providers. Rules and policies are used to determine which tasks can run in parallel and which need to be serialized. Once the tenant network is built, customers can define how the traffic should flow by defining policies. Customers can also request a scale up, which is typically handled by a dataplane or devops artificial agent.

In a specific implementation, updates to a tenant network are handled effectively by a diff service which could detect what changed in tenant networks and it only creates tasks for that. For example, a diff file can be implemented as a JSON object, an original of which is kept in the dataplane. When a customer modifies the tenant network, a diff of objects is created and one or more tasks are generated in response to the differences.

An orchestration framework has intelligence about resource capacity (compute, network, memory, etc.), health metrics, inventory of connectors and service, cloud provider capabilities and limits, and the like. When a tenant needs to be onboarded Orchestration framework dynamically onboards it on a CXP and CSN where there is a capacity and is nearest to the tenant.

Figure 5:
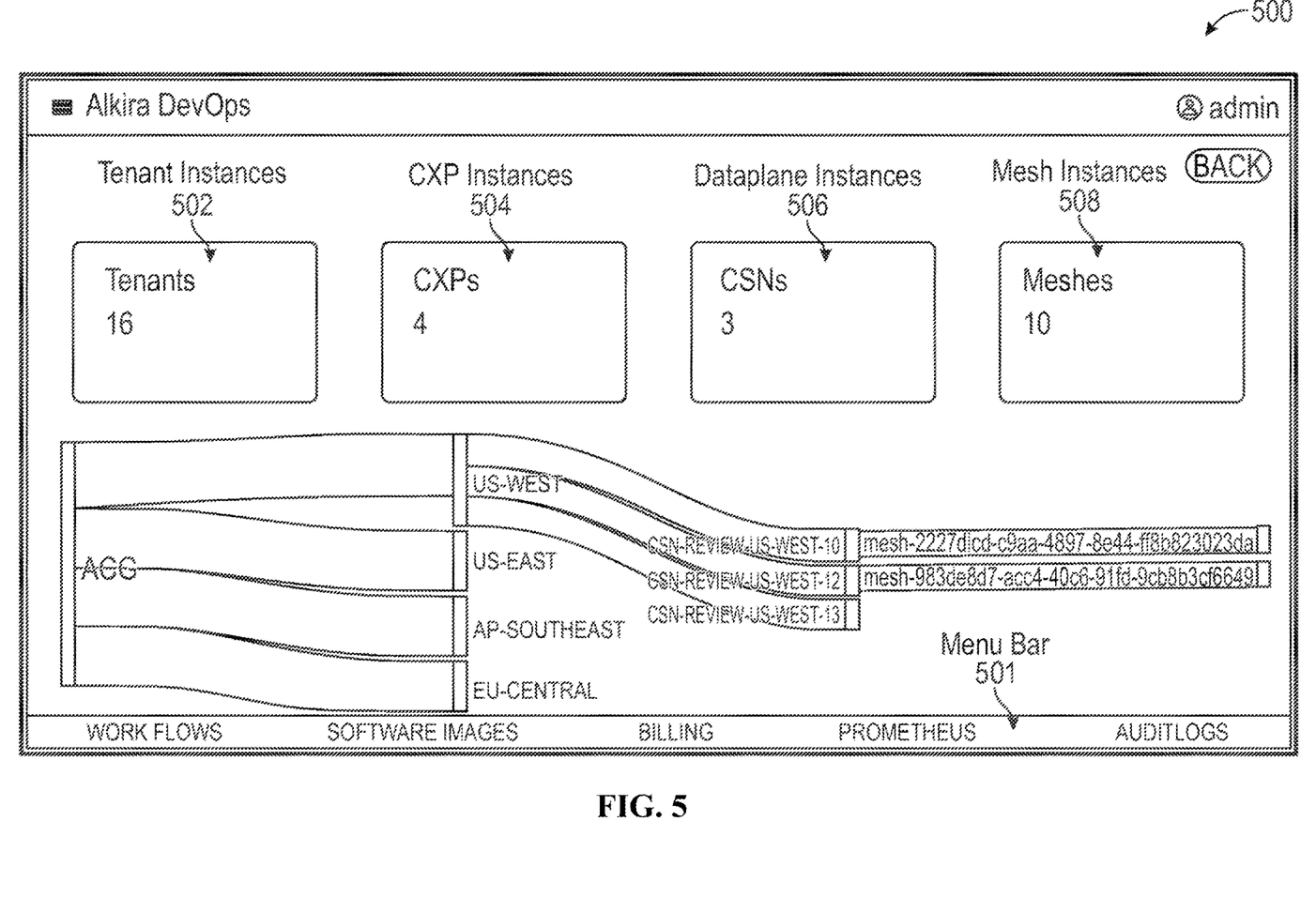
FIG. 5 is a screen shot of an example of a browser interface for a dev ops admin.

FIG. 5 is a screen shot 500 of an example of a browser interface for a dev ops admin. The screen shot 500 includes tenant instances 502 (and below the tenant instances count, a graphic that can be selected to provide more information about individual tenants), CXP instances 504 (and below the CXP instances count, a graphic that can be selected to provide more information about individual CXPs), dataplane instances 506 (and below the dataplane instances count, a graphic that can be selected to provide more information about individual dataplanes), mesh instances 508 (and below the mesh instances count, a graphic that can be selected to provide more information about individual meshes), and a menu bar 501 (which allows an admin to choose actions from categories such as work flows, software images, billing, event monitoring and alerting (e.g., Prometheus), and audit logs).

In a specific implementation, a tenant is onboarded by DevOps through the DevOps portal and a tenant account is created. Tenants that grow can be scaled up to desired bandwidth by moving the tenant to another CXP, dataplane, or both as required. Auto scaling is done by DevOps Admin via Devops Portal, so a tenant can start with a relatively small footprint and increase on demand (to a relatively larger footprint). Advantageously, each task is idempotent, so in case of provision failing in the middle, it can be retried once the problem is fixed out of band by DevOps Admin or Customer. Retry can be of different types (e.g., RetryPending, RetryNextPending (skip current failed task), or the like).

What is claimed is:

1. A system, comprising:
    a dataplane management gateway;
    a dataplane management means, coupled to the dataplane management gateway, configured to:
        manage platform-agnostic customer requests by onboarding on a nearest-to-customer platform and splitting requests into granular tasks to be carried out in a given region; and
        fix out-of-band and retry when a task of the granular tasks fails, wherein the retry comprises selectively retrying failed tasks using multiple retry strategies comprising:
            retrying the exact same task;
            skipping the current failed task and proceed to the next pending task; and
            retrying orchestration from a specific point of failure to minimize reprovisioning overhead;
    a customer gateway for providing customer access to a customer network;
    a tenant management means coupled to the customer gateway;
    a tenant provisioning means coupled to the customer gateway;
    a resource management means coupled to the customer gateway;
    wherein, in operation, the dataplane management means is further configured to facilitate communication between a first admin agent and a dataplane provisioning and orchestration system; the tenant management means is configured to facilitate communication between a second admin agent and the dataplane provisioning and orchestration system; the tenant provisioning means is configured to facilitate communication between a third admin agent and the dataplane provisioning and orchestration system; and the resource management means is configured to enable a customer agent to express intent regarding resource management; and
    wherein the intent is expressed in terms of connectors, services, and applications.

2. The system of claim 1, wherein the dataplane management gateway is configured to provide an admin access to underlying infrastructure onto which tenants are onboarded.

3. The system of claim 1, wherein connectivity to the dataplane management gateway is via a first browser and wherein connectivity to the customer gateway is via a second browser.

4. The system of claim 1, wherein the dataplane management means is further configured to stitch tunnels into a dataplane and enable control flows using policy.

5. The system of claim 1, wherein the dataplane management gateway is a devops gateway and dataplane management is handled by a separate entity.

6. The system of claim 1, wherein the customer gateway is configured to provide customer access to the customer network without exposing underlying infrastructure onto which tenants are onboarded.

7. The system of claim 1, wherein the tenant management means is further configured to enable the customer agent to express intent regarding tenant management.

8. The system of claim 1, wherein the tenant provisioning means is configured to spin up nodes and build a mesh.

9. The system of claim 1, wherein the tenant provisioning means is further configured to communicate to the resource management means, which has a full dataplane view, including mappings of dataplane components.

10. The system of claim 1, further comprising a diff service configured to:
    detect changes in a customer network configuration;
    generate a diff object representing the detected changes in the customer network configuration;
    create targeted tasks specific to the detected changes in the customer network configuration;
    maintain an original network configuration object in the dataplane; and
    minimize reprovisioning by only addressing detected changes in the customer network configuration.

* * * * *